United States Patent [19]

Ueno

[11] 3,963,379
[45] June 15, 1976

[54] CONVERTIBLE ENGINE-AIR COMPRESSOR APPARATUS FOR DRIVING A VEHICLE

[76] Inventor: Takahiro Ueno, 5-11, 4-Bancho, Wakayama, Japan

[22] Filed: June 10, 1974

[21] Appl. No.: 477,791

Related U.S. Application Data

[63] Continuation-in-part of Ser. No. 369,119, June 11, 1973, abandoned.

[30] Foreign Application Priority Data

June 12, 1973 Japan.............................. 48-66500
June 14, 1973 Japan.............................. 48-67578

[52] U.S. Cl............................. 417/237; 123/90.18; 123/198 F; 123/DIG. 7; 60/712
[51] Int. Cl.²...................... F04B 41/04; F04B 7/00
[58] Field of Search................. 417/237; 123/90.18, 123/198 F, DIG. 7, DIG. 1; 60/712

[56] References Cited

UNITED STATES PATENTS

| | | | |
|---|---|---|---|
| 1,013,528 | 1/1912 | Broderick | 60/712 |
| 1,497,206 | 6/1924 | Booton | 123/90.18 |
| 1,556,410 | 10/1925 | Boyer | 123/90.18 |
| 2,676,752 | 4/1954 | Ochel et al. | 417/237 |
| 3,023,870 | 3/1962 | Udelman | 123/90.18 |
| 3,426,523 | 2/1969 | Straub | 417/237 |

*Primary Examiner*—William L. Freeh
*Assistant Examiner*—Richard E. Gluck

[57] ABSTRACT

A vehicle is provided with an engine which is adapted to serve as an air compressor. Air supply apparatus is provided for interrupting the supply of fuel to the engine and for supplying air to the engine. Compressed air from the engine is delivered to an air tank.

2 Claims, 14 Drawing Figures

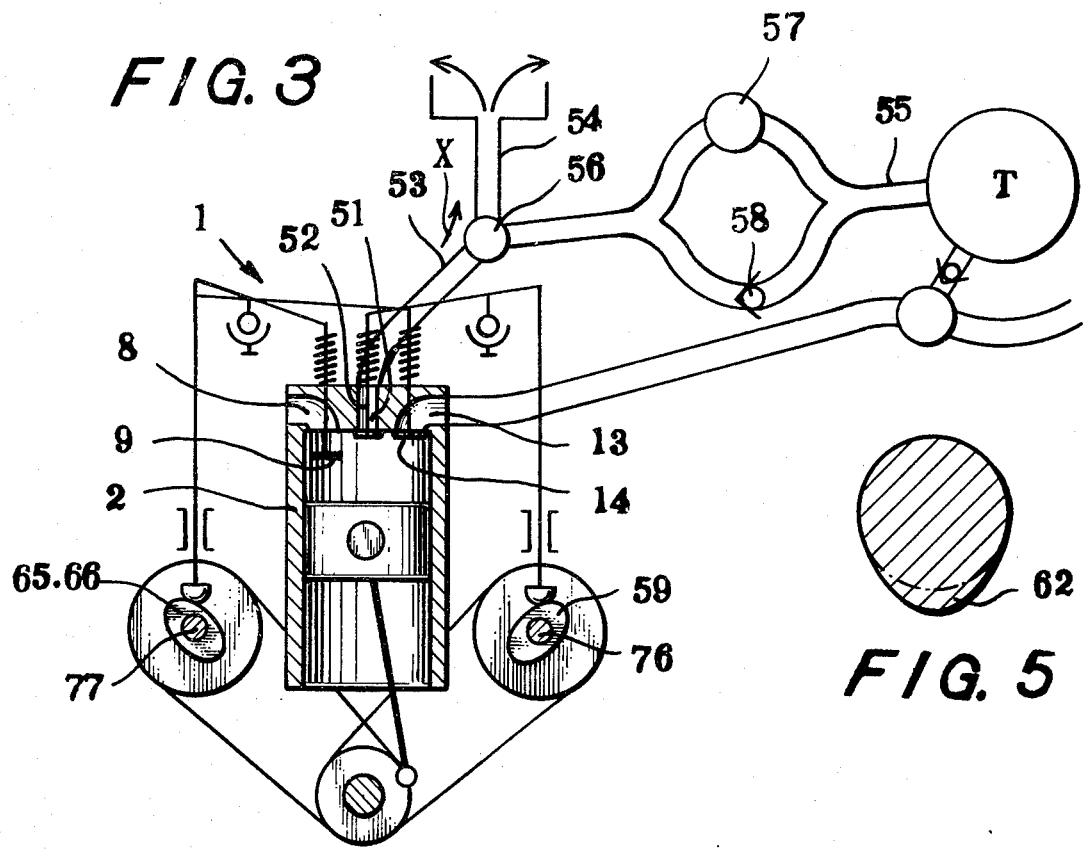
FIG. 3
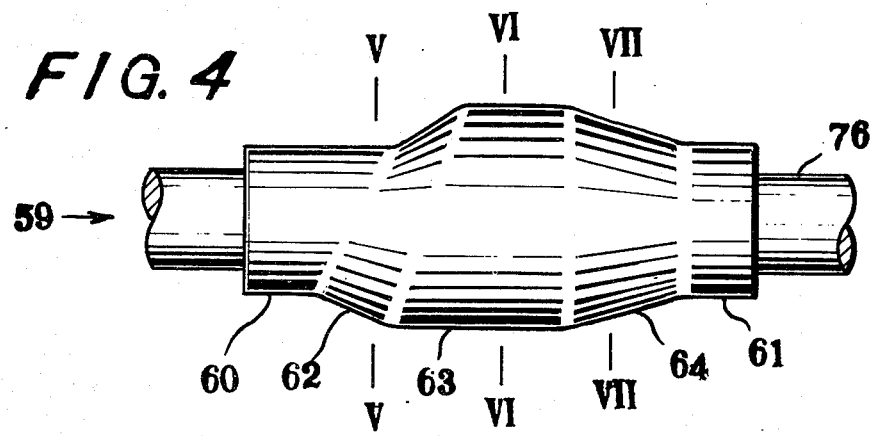
FIG. 4
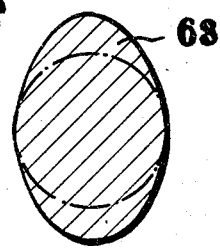
FIG. 6
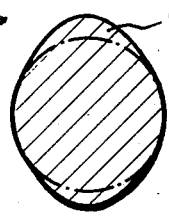
FIG. 7
FIG. 5

CONVERTIBLE ENGINE-AIR COMPRESSOR APPARATUS FOR DRIVING A VEHICLE

RELATED APPLICATION

This application is a continuation-in-part of Ser. No. 369,119, filed June 11, 1973 now abandoned.

The present invention relates to a vehicle provided thereon with an engine adapted to serve as an air-compressor.

The present invention covers all vehicles such as an automobile, a street car, ship, airplane or the like, and said engine is an internal combustion engine such as a gasoline engine, Diesel engine or their 4 cycle engine, 2 cycle engine, rotary engine or the like.

However, in this application, only a car provided thereon with a gasoline engine or Diesel engine is described for the purpose of simple explanation.

Recently, environmental pollution caused by exhaust gas of cars is a serious problem. It is because cars are obliged to stop and start frequently due to traffic congestion, signal turns or the like so that cars exhaust much gas at the time of starting and acceleration, and further at such times, much fuel is consumed.

It is an earnest demand to eliminate such disadvantages of cars thus preventing exhaust gas pollution and achieving reduction of energy required.

The present invention can meet with such a social demand. That is, the present invention relates to a vehicle provided with an engine in which compressed air, obtained by making an engine of the vehicle to take an air compression action at the time of stopping or deceleration of the vehicle, and supplying the engine with said compressed air to make it to serve as an air motor.

The conventional engine is used only for driving a vehicle, and hardly applied for any other purpose. However, it is known that an engine has substantially the same structure with an air-compressor, and can work as an air-compressor by stopping fuelling, supplying only air and at the same time changing the timing of opening and closing an exhaust port. Therefore, by dividing a number of chambers into two, and making one group of chambers to take engine action, and making the other group to take continuously compression action by using driving force of said engine, or by making all chambers of the engine temporarily to work as air-compressor at the time of deceleration of the car, using kinetic energy belonging to the car and the engine of its own. In this connection, it is also possible to make an engine with a single cylinder to take a compression action during the time of reduction.

Further, it is well-known that engine can be driven by introducing high pressure air into chambers at suction step, and by periodically supplying chambers with said high pressure air the engine (not fuelled) can be driven to work as an air-motor (air engine). In case of thus driving as an air-motor, the engine is in the state for a compression action, and high pressure air is supplied instead of air, thereby turning a crank-shaft to drive the engine.

Further, compressed air obtained by a compression action of the engine can be used not only for operating the engine as an air-motor, but for controlling the vehicle by applying vacuum by means of an air ejector and converting vacuum force resulting from said vacuum effect into suction force.

The important object of present invention is to provide a vehicle on which mounted is an engine adapted to serve as an air compressor by stopping fuelling all or a part of chambers and by supplying them with air only.

Another important object of the present invention is to provide a vehicle on which is mounted a combination engine and an air compressor in which air motor action (air engine action) is achieved by setting the engine in the state of compression action and introducing compressed air through an inlet or exhaust port into chambers.

A further important object of the present invention is to provide a combination engine and air compressor apparatus in which provided on each valve spring of an inlet and an exhaust valves is a spring force adjusting means for suitably adjusting the spring forces to be of middle strength during engine action, strong during air compression action and air motor action, and reduced at the time of change-over of each action.

A further important object of the present invention is to provide an engine which can serve as an air compressor and which is adapted to be rotated by introducing high pressure air through an air port provided between an inlet port and an exhaust port into chambers.

A further important object of the present invention is to provide a braking apparatus adapted to brake a vehicle by dropping a suction device onto a travelling surface, taking out air out of the space between said suction device and said travelling surface and thereby make said suction device to be suckedly attached to said travelling surface.

According to the present invention, an engine adapted to serve as an air compressor is an internal combustion engine to be mounted on a car, a locomotive, a ship or the like, and is an improvement of a conventional engine comprising one or more cylinders, a piston adapted to slide in said cylinder, an inlet and an exhaust valves for opening and closing an inlet and an exhaust ports formed in the upper portion of said cylinder, a cam shaft constituting cams for operating said inlet and said exhaust valves, a means communicated with said inlet port for supplying the same with fuel and air, a means communicated with said exhaust port for guiding exhaust gas, and others.

In other words, the engine of the present invention is formed by providing a known engine with air supply means adapted to stop fuelling chambers and supply them air only, an air take-out means for taking out air compressed in said chambers at a desired time, a compressed air tank connected to an exhaust pipe constituting a part of said air take-out means, an operating means for operating said air supply means and said air take-out means each at a desired time.

Said air supply means is a means for stopping fuelling a carbureter at the position of a magnet valve or changing the passage of the inlet pipe thereby making air only to be supplied into the chambers. Further, said air take-out means is a means in which another cam for an inlet valve and another cam for an exhaust valve for an air compression action are provided on a cam shaft having a cam for inlet valve and a cam for exhaust valve, and a displacing means is also provided for displacing said cam shaft in the axial direction so as to change-over said cam for an engine action and said cam for an air compression action to each other, so that said inlet valve of said cylinder supplied with air only is opened at the time of piston being lowered, while said exhaust valve is opened at the end of piston being raised, and further, the passage of exhaust gas can be changed by means of magnet valves thus affording to store compressed air.

Said operating means is a means for operating said magnet valves of said air supply means, said displacing means and said magnet valves of said air take-out means and the like at a desired time.

A high pressure air supply means is a means which is adapted to stop supplying chambers with fuel or air, supplies them with high pressure air through an inlet port during the time of engine stopping so that a piston is driven by expansion force of said high pressure air thus affording to start-up the engine or rotate it in a short time.

These and other objects of the present invention will become more apparent from the following description of various kinds of embodiments given with reference to the appended drawings.

FIG. 3 gives a schematic cross-sectional view of a cylinder provided with a port and a valve for residual-air exhaust or high pressure-air supply associated therewith.

FIG. 4 gives a front view of a cam actuating the valve for residual-air exhaust and high pressure air supply.

FIG. 5 gives an end view taken along the line V—V of FIG. 4.

FIG. 6 gives an end view taken along the line VI—VI of FIG. 4.

FIG. 7 gives an end view taken along the line VII—VII of FIG. 4.

Figure 8:
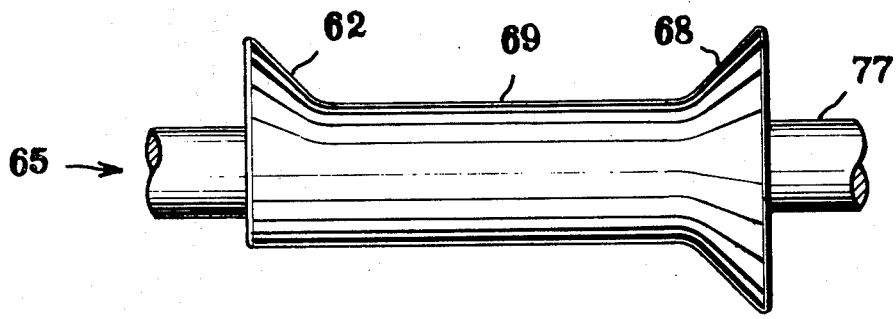

FIG. 8 gives a front view of the suction cam.

Figure 9:
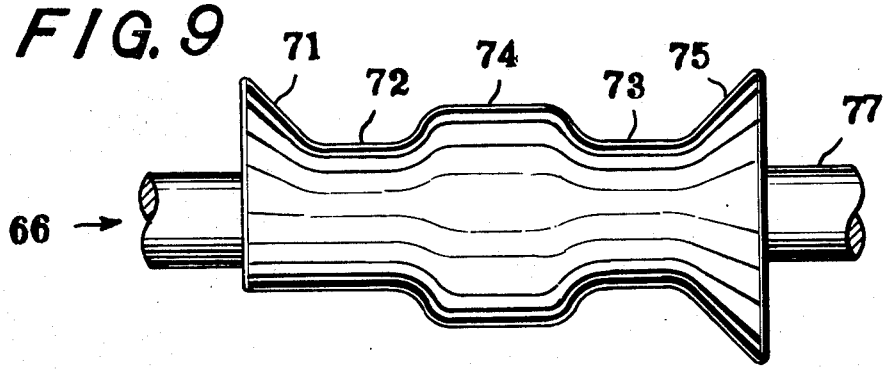

FIG. 9 gives a front view of the exhaust cam.

Figure 10:
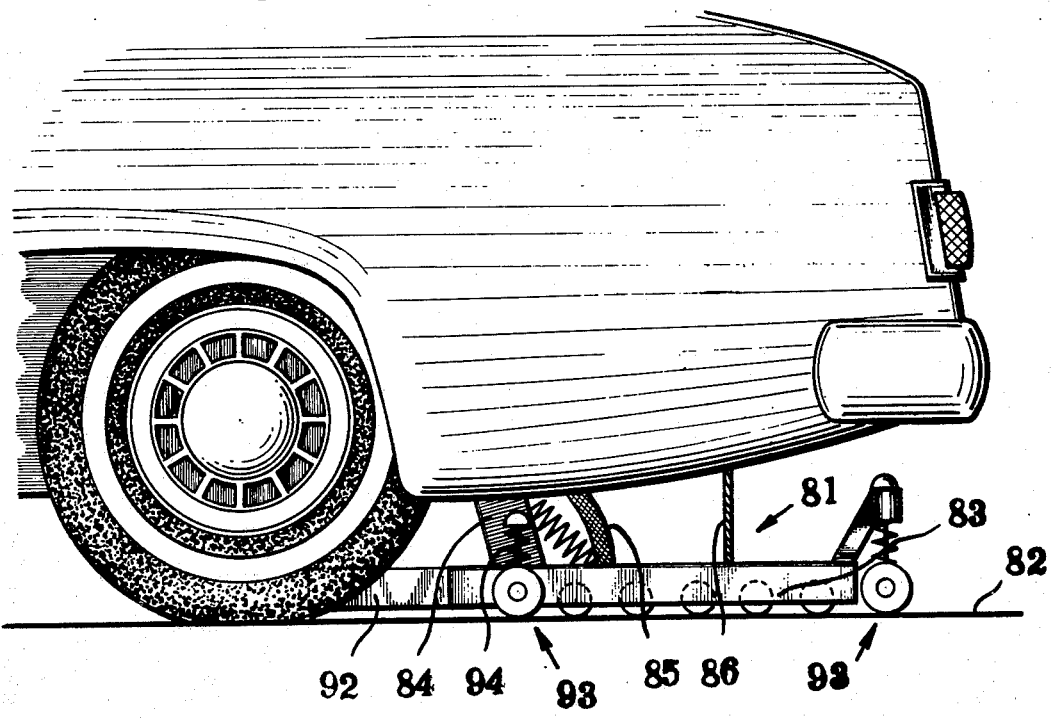
Figure 11:
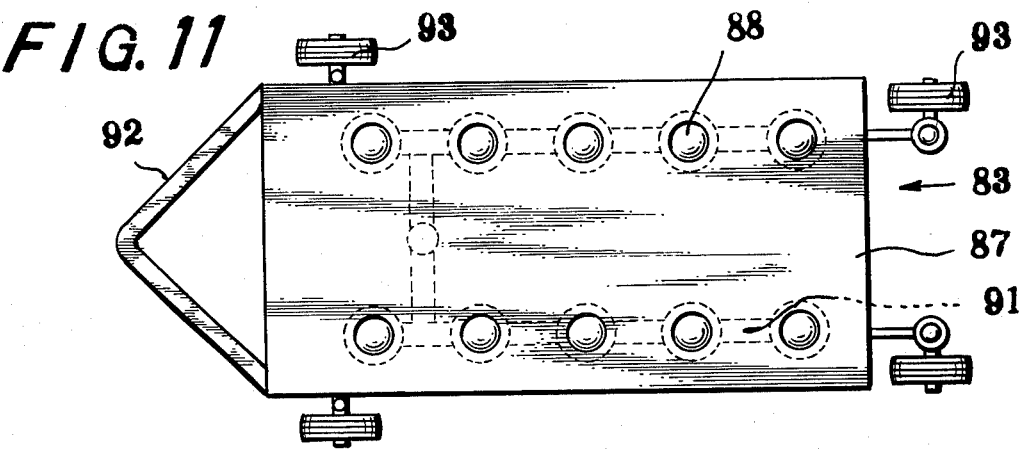
Figure 12:
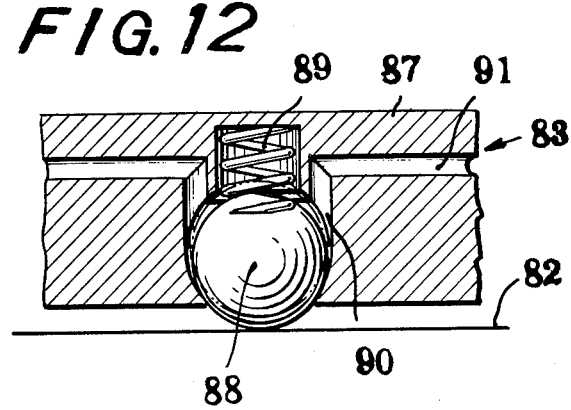
Figure 13:
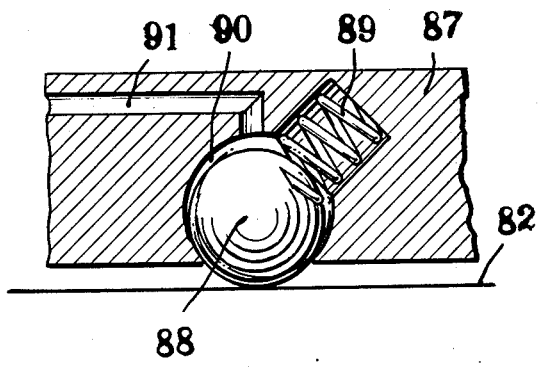

FIG. 10 illustrates a braking apparatus mounted on a vehicle and braked;

FIG. 11 is a bottom elevation of a suction device;

FIG. 12 is a cross-section illustrating an embodiment of ball's attachment;

FIG. 13 is a cross-section of a modified embodiment of ball's attachment; and

Figure 14:
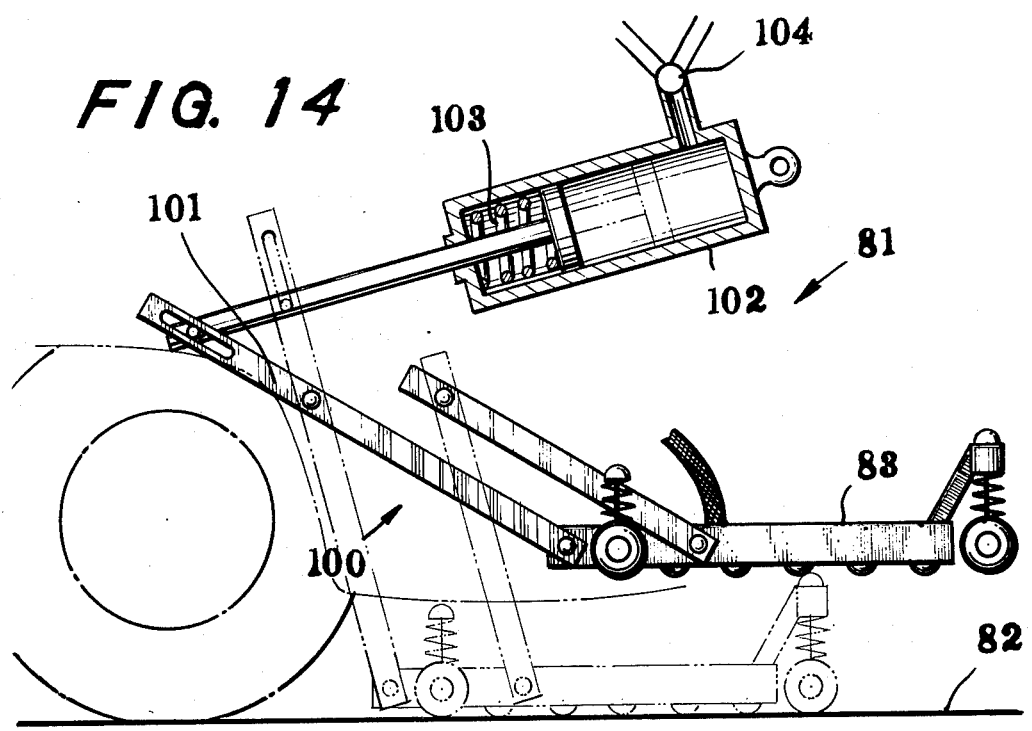

FIG. 14 illustrates a supporting means.

Figure 1:
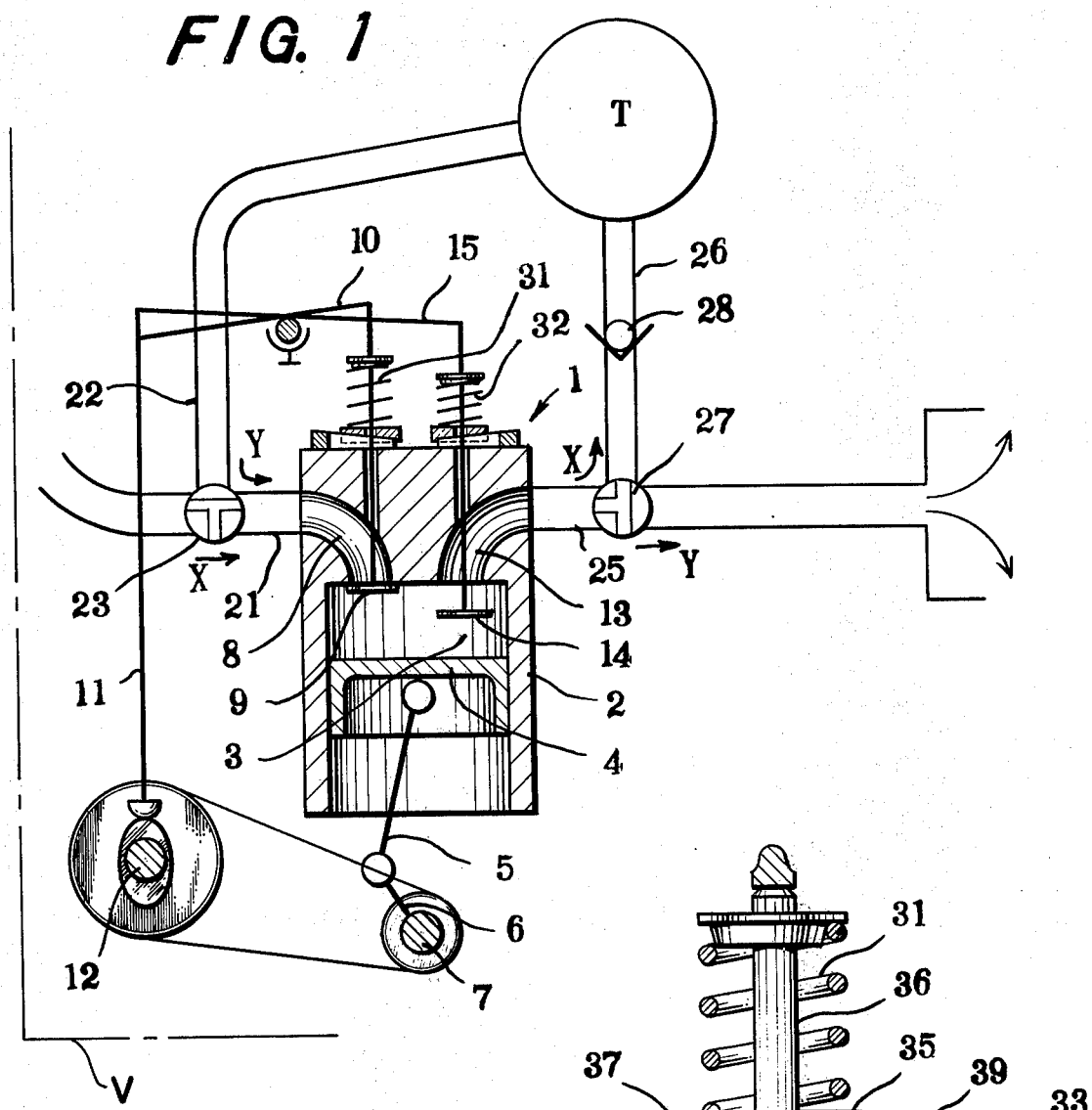
FIG. 1 is a schematic view showing a compression chamber in an engine of the present invention.
Figure 2:
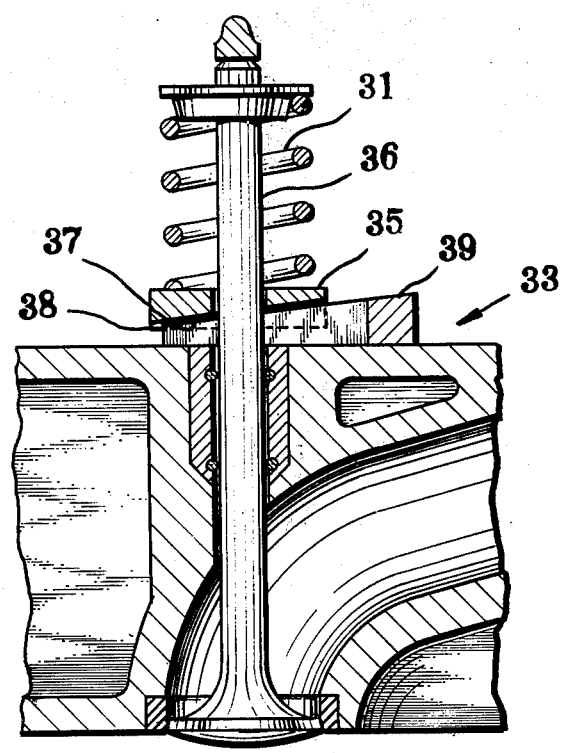
FIG. 2 is a section of a cylinder head showing a means for adjusting spring force.

Referring to the appended drawings, FIG. 1 illustrates a first typical embodiment of an engine mounted on a vehicle V according to the present invention, wherein numeral 1 indicates a 4 cycle gasoline engine with a number of chambers longitudinally sectioned for the purpose of illustration, said engine being adapted to serve as an air-compressor by stopping fuelling, and supplying only air, though such structure is not shown.

Numeral 2 indicates a cylinder providing a compression chamber 3, in which a piston 4 is connected through a connecting rod and a crank arm 6 to a crank shaft 7.

Numeral 8 indicates an inlet port opened and closed by an inlet valve 9 which is driven through a rocker arm 10 and a valve push rod 11 and others by a cam shaft 12. 13 indicates an exhaust port opened and closed by an exhaust valve 14 which is driven through a rocker arm 15 and a valve push rod and others by said cam shaft 12, similarly to the inlet valve 9. Said cam shaft 12 can make half a revolution per one revolution of the crank shaft 7 and be axially displaced by a displacing means. Each of a cam for suction and a cam for exhaust provided on the cam shaft 12 has a cam portion for engine action and another cam portion for compression action, and the valve timing can be changed by axially displacing the cam shaft. As said cams for the inlet and exhaust valves, used are, for example, cams similar to a cam 65 for an inlet valve and a cam 66 for an exhaust valve mentioned below in the description of the second embodiment. In this case, however, a cylinder section 69 of the cam 65 is made in the same form with an air motor section 74 of the cam 66. The cam portion for compression action is adapted to change the 4 cycle engine into 2 cycle engine involving suction and exhaust steps, and make overlap to 0 or close to 0. And in case the engine serves as an air-motor, the valve is driven by means of said cam portion for compression action.

A pipe 22 is connected to an inlet pipe 21 which is communicated with the inlet port 8. The pipe 22 is communicated with an air tank T for storage of compressed air obtained by compression action of the engine. In the air tank T there is a pressure of 8 – 10 $kg/cm^2$ in case of an engine serving as an air-compressor of 1 step compression type, and 20 – 30 $kg/cm^2$ in case of a Diesel engine serving as 2 step compression type, of air is contained. The inlet pipe 21 and the pipe 22 are connected through a 3-way magnet valve 23 to each other, and adapted to supply the inlet port 8 with mixed gas of fuel and air, air only or high pressure air. The 3-way magnet valve 23 is operated by an operating means.

A check valve 28 is provided on said pipe 28 so that high pressure air in the air tank T is prevented from flowing to the exhaust port.

A pipe 26 communicated with the air tank T is connected through a 3-way magnet valve to the exhaust pipe 25 communicated with the exhaust port 13.

In case of making the engine 1 to take a compression action, by operating the operating means thus communicating 3-way magnet valves 23, 27 with each other in the X direction and converting the valve-timing to that for compression action.

Air having passed through a carburetor is supplied through the inlet port 8 into the chamber 2, and compressed therein and then supplied through the exhaust port 13 and 3-way magnet valve 27 into the air tank T to be stored therein.

In case that the engine is operated to positively rotate as an air-motor, 3-way magnet valves 23, 27 are communicated in the Y direction by operating the operating means, and the inlet valve and the exhaust valve are operated at the same timing with that of compression action.

When the flow takes Y direction through the 3-way magnet valves 23, compressed air (having pressure of 8 – 10 $kg/cm^2$ or 20 – 30 $kg/cm^2$) in the air tank T flows to the inlet port 8, and is supplied into the chamber 2 by opening the inlet valve, then pushing down the piston 4. Energy of the high pressure air is consumed for operating the piston, and then discharged out through the exhaust pipe 25 by opening the exhaust valve 14.

Preferably the said selective operating of the engine as an engine, a compressor or as an air-motor is in interlocking connection with an acceleration pedal and a braking pedal or is changed-over by means of finger-lever. In other words, when starting the vehicle by stepping the acceleration pedal, the engine is made to momentarily work as an air-motor thereby starting-up the vehicle, and then to take an engine action, or to continuously work as an air-motor in a short time for travelling in a short distance and then to take an engine action for normal travelling.

And, when the vehicle is braked by stepping the braking pedal, engine is made to momentarily take a compression action, and kinetic energy belonging to the vehicle and the engine is converted into energy for compressing air, thus braking the vehicle and at the same time obtaining compressed air.

Further, during the car stopping or parking, half a plurality of chambers are made to take compression action, thus storing compressed air in the air tank. For this purpose, an operating means is adapted to manually carry out this operation.

Further, in case of using the engine as an air motor, it is possible that half a plurality of chambers are for an air motor action, while the other half are for an engine action. After operating said chambers for an air motor action for a short time, said chambers for an engine action are fuelled to take an engine action, so that the chambers for an engine action are driven at a given rotation rate and the vehicle runs at a low speed, when said air motor section of the engine can be subject to unloaded rotation by stopping supplying said section with high pressure air, air and fuel.

In the abovementioned embodiment, in case of an engine with five or more cylinders, an inlet valve of any one of said cylinder is opened, so that said chamber can be supplied with high pressure air thus easily affording to be operated as an air motor. However, in case of an engine with four or less cylinders, and especially with a single cylinder, a piston sometimes stops at the upper or lower dead point, thus causing an inlet valve to be closed.

Therefore, a decompression device (not shown) is provided for opening such a closed valve so as to make the engine to take an air motor action. In this case, the decompression device is not a device for pressure reduction but for pushing down a valve stem of the inlet valve to introduce air and for momentarily opening the inlet valve of the engine set for an air motor action so as to compulsorily introducing high pressure air into a chamber thus rotating a crank shaft. In case that said crank shaft rotates in the positive direction, the inlet valve can take a normal opening and closing operation thereby immediately working as an air motor. On the contrary, in case that said crank shaft rotates in the reverse direction, said inlet valve is opened during the piston being raised and high pressure air injected through an inlet port causes the piston to be lowered, so that the rotation of the crank shaft turns into the positive direction.

In case of an engine with two or four cylinders, a piston of any one of said cylinders stops at the upper dead point even when the piston stops at a dead point, a crank shaft can be rotated a little. But in case of an engine with a single cylinder, a piston possibly stops at the lower dead point. Therefore, in case of an engine with a single cylinder, said engine is made to have such a construction that a little volume of low pressure air can be injected through an air exhuast port of a crank chamber. And there, a decompression device is operated after a piston is once displaced to the upper dead point.

Numeral 33 indicates spring force adjusting means for changing each spring force of a valve spring 31 of the inlet valve 7 and a valve spring 32 of the exhaust valve 14. This is because it is necessary to adjust spring forces for sure opening and closing of the valves, since the engine takes three different forms of actions, i.e., engine action, compression action and air-motor action so that exerted on the inlet and exhaust valves is different force from that in only normal engine action.

In other words, in a compression action and a reversely rotating air-motor action, the exhaust pipe 25 is closed by the 3-way magnet valve 27, so that high pressure air stays between the 3-way magnet valve 27 causing the exhaust valve 14 to open. Further, in positively rotating air-motion action, high pressure air from the air-tank T flows through the pipe 22 into the inlet pipe 21, exerting force to open the inlet valve 9. Therefore, the stretching force of the valve springs 31, 32 is decreased so that full closing of the inlet and the exhaust valves are unobtainable. This results in demand for a means for perfectly closing the valves against such back pressure. Further, on the contrary, in case of changing valve timing, a cam section in contact with a valve tappet have to be changed from a cam section for an engine action into one for a compression action by displacing a cam shaft. Such transferring of the tappet is facilitated by forming said cam section into an inclined cam. But if the valve springs 31, 32 are strong, large force is required for displacing said cam shaft 12. Therefore, in such a case, preferably the spring forces of the valve springs are small. A means for adjusting spring forces is provided so as to make strong the spring forces of the exhaust valve spring during a compression action, and that of inlet valve spring during an air motor action, while making the spring forces of both the valves to be of middle strength during an engine action and of reduced strength during displacement of the cam shaft.

Numeral 35 indicates a circular plate fitted into a valve stem 36 and adapted to receive the valve spring at the upper surface thereof. On the lower surface of said circular plate, provided is a channel 38 having an inclined face 37. Into said channel 38, inserted is a wedge 39 formed into a fork like shape, and movable perpendicularly to the displacement direction of the valve stem 36. Said wedge 39 is adapted to raise and lower said circular plate 35 by being displaced by means of an air cylinder (not shown). Said air cylinder can move said circular plate vertically by three steps. The spring force is adjusted for an engine action when the circular plate is in the middle step, for a cam change-over action when the plate is the lower step and for a compression action or an air motor action when the plate is in the upper step. Air cylinders of the means 31, 32 for adjusting the spring forces are driven simultaneously when the circular plate is displaced to the middle and the lower steps, and separatedly when the plate is displaced to the upper step.

In a modified embodiment of said means for adjusting spring force, said circular plate 35 and said wedge 39 are replaced by a ring-shaped air cylinder fitted to the valve stem 36 and fixed on the cylinder head 40, and the spring forces of the valve springs are changed in accordance with the amount of displacement of a cylinder rod. Further, said means for adjusting spring force may be applied for an engine not adapted to serve as an air compressor, and also may be used as a means for increasing spring force to ensure the opening and closing operation of a valve at the time of an engine rotating at a high speed. The second embodiment of the present invention is shown is FIGS. 3–9, in which compressed air is supplied in a different manner from that of the first embodiment. In other words, in this embodiment the third air port and valve are newly provided for actuating the engine with air, while in the first embodiment the engine is operated as an air motor by supplying compressed air through the inlet port and the exhaust port provided on the engine. Numeral 51 indicates an air port constituting said third air port formed between the inlet port 8 and the exhaust port 13 and adapted to be opened and closed by means of a valve 52. Said air port 51 is also a residual gas exhaust port for exhausting residual gas in the clearance volume.

In a breeches pipe 53 that is connected to said port 51, one branch 54 is connected to either free air or a supercharger, while the other branch 55 to a high pressure tank that contains a compressed air of approximately 20 to 30 kg/cm² (possibly 8 – 10 kg/cm²). On the pipe 55 provided are an opening and closing valve 57 for supplying high pressure air from the tank T to the air port 51, and a check valve 58 for supplying high pressure air from the air port 51 to the tank T. The compressed air in said tank has been obtained by the compressor action of engine, which can be alternatively supplied from exterior. A 3-way magnet valve 56 is provided at the branching of the breeches pipe 53, which switches the air flow between branches 54 and 55.

FIGS. 4 to 7 give a cam 59 actuating the valve 52, which cam comprises a cylindrical segment 60 that never pushes the tappet, a cylindrical segment 61 that always open the valve 52, a start-up segment 62 that actuates the valve 52 during a period corresponding to approximately the explosion stroke in the engine action, an air-motor segment 63 that actuates said valve during a period corresponding to the explosion and suction strokes, and a residual-air exhaust segment 64 that actuates said valve to displace the residual air during a period of engine compressor action.

FIGS. 8 and 9 illustrate a suction cam 65 and an exhaust cam 66. The suction cam 65 comprises an engine action segment 62 with a taper cam profile and a compressor action segment 68, and an additional cylindrical segment 69 that never actuates the suction valve. The exhaust cam 66 comprises an engine action segment 71, cylindrical segments 72, 73 that never actuate the exhaust valve, an air motor segment 74 that opens the exhaust valve in a period corresponding to the engine exhaust and compression strokes as the air motor segment 63 actuates said valve 52, and a compressor action segment 75. It is noted that end surfaces of engine action segments 67, 71 are shaped nearly equivalent to that of the start-up segment 62 of the cam 59 as illustrated in FIG. 5, while end surfaces of compressor action segments 68, 75 and the air motor segment 74 to that of the air motor segment 63 of the cam 59 as illustrated in FIG. 6. And the 3-way magnet valve 56 is opened so as to pass the flow in X direction only when residual air is to be discharged out in the atomosphere.

A magnet valve provided to control the flow of the compressed air injected from the high pressure tank T through the pipe 55 into the air port 51 is so designed that such magnet valve is kept open only when the tappet is in contact with the start-up segment 62 and the air motor segment 63.

The cam shaft 76 that is fitted with the cam 59 actuating said valve 52 is provided independent of the cam shaft 77 that if fitted with the suction cam 65 and the exhaust cam 66. Each cam shaft is shifted at five steps by the action of either hydraulic or electric cam change-over mechanism to select proper cams.

During the start-up of engine action, tappets are in contact with the start-up segment 62, the engine action segments 67 and 71.

As soon as the cam 59 is shifted so that the tappet gets in touch with the start-up segment 62, a compressed air of some 20 to 30 kg/cm² flows into each compressor chamber of the engine to start up. The cam 69 is shifted back thereafter to switch over to the cylindrical segment 60 for the ordinary engine action.

When the engine is operated as an air motor without supply of fuel (the fuel cannot be supplied in cases of gasoline deficiency or occurrence of inflammable gas), tappets are in contact with the air motor segment 63, the cylindrical segment 69, and the air motor segment 74 so that compressed air is injected into the compression chambers twice as often as it is during the start-up to continuously run the engine.

When the engine is operated as a compressor, tappets are in contact with the residual air exhaust segment 64 and the compressor action segments 68 and 75, so that the 4-cycle engine works as a 2-cycle air compressor with the residual air being displaced through the port 51. When only the cam 69 is shifted in this configuration to make the tappet get in touch with the cylindrical segment 61, the valve 52 is kept only slightly opened to serve as an unloader means.

Further, an air motor action is started-up by momentarily opening the air port 52 by means of a decompression device provided similarly to the first embodiment. Numeral 81 indicates a braking apparatus mounted on the rear bottom surface of a vehicle body. The apparatus 81 comprises a suction device 83 disposed in contact with a travelling surface 82, a supporting member for pivotally mounting said suction device 83 on a vehicle body, a vacuum means (not shown) for letting out air between said suction device 83 and said travelling surface 82 and a flexible pipe 85 for letting out said air, and a hoisting means 86 for hoisting the suction device 83.

A body of the suction device 83 is provided therein with a plurality of balls 88 and springs for making each of said balls 88 extruded from the lower surface of the body 87. Each of a plurality of holes 90 in the body 87, in which each of said balls is disposed, is a little larger than the ball in diameter, and is so designed that only a part of the ball surface is extruded.

The balls 88 and the holes 90 may be so designed that their diameters are gradually decreased from the front portion to the rear portion of the suction device 83, thereby affording to more effectively absorb shock resulting from dropping of the device 83. Said holes 90 are communicated with a pipe 90 connected through a pipe 91 to the vacuum means.

Referring now to FIG. 12, the suction device is so adapted that the balls 88 can be vertically raised. On the other hand, in FIG. 13, the suction device is so adapted that the balls can move rearwardly and upwardly with respect to the travelling direction of the vehicle, the movement of each ball is within a scope from the position at which a part of the ball is a little extruded from the lower surface of the body of the device 83 to the position at which the ball surface is substantially coplanar with the lower surface of the body 87 of the device 83 (as shown in imaginary line).

The balls 88 serves as valves for the pipe 91, and when the balls are raised, the pipe 91 comes into communication with the outside of the suction device.

The supporting member 84 is pivotally mounted at the one end thereof on the vehicle body, while the other end is connected through a pivotal connecting means such as a hinge to the suction device 83.

The vacuum means is connected through an air ejector to an air tank T, and adapted to provide the ejector with compressed air obtained by an air compression action of an engine, and then to take out air from the pipe 85.

According to this method, braking force resulting from a compression action of an engine is exerted on a vehicle, and further a braking device is driven by compressed air obtained in said compression action, so that strong braking can be achieved without any energy source for operating them. Alternatively, by newly providing a vacuum tank and an ejector disposed on a part of an exhaust pipe of the vehicle, and keeping said vacuum tank always in a vacuum state by using exhaust air of the vehicle of air used in an air motor action of the engine, suction force can be applied on the suction device by means of said vacuum tank.

Said vacuum means is provided with means for releasing or locking vacuum state thereof. The hoisting means 86 is adapted to hoist wire rope secured to the body 87 of the suction device 83 by means of a winding device which is preferably able to be operated at the driver's stand and driven by air pressure. Numeral 92 indicates a dust guard provided at the front end of the suction device 83. Numeral 93 indicates a wheel for buffering dropping shock of the device 83. Further, in FIG. 14, illustrated is a supporting means having a modified supporting member and hoisting means. Numeral 100 indicates a linking means, a link 101 of which is pivotally supported at one position by the body 87 and the upper end thereof is connected to a cylinder 102. Said cylinder 102 is adapted to hoist the suction device 83 by introducing high pressure air thereinto and to lower it by letting said air out through a 3-way magnet valve (with a help of extension force of a spring 103).

The operation of the apparatus is as follows.

On putting on a dive brake, the winding means operates and the braking apparatus 81 drops onto the travelling surface 82. Firstly the balls 88 come into contact with the travelling surface 82, and then the lower surface of the suction device 83 contacts with said travelling surface, while dropping shock is absorbed by the spring 89, so that the pipe 91 becomes communicated with a space defined between the suction device and the travelling surface. Simultaneously with the dive brake put on, the engine takes an compression action and compressed air operates the vacuum means to take air out of the pipe 85, the pipe 91 and the space between the suction device and the travelling surface thereby bringing them into a substantially vacuum state. Thus suction force is exerted and the suction device is suckedly attached to the travelling surface, so that braking force and body lowering force are exerted on the vehicle. The suction device is dragged on the surface till the braking force causes the vehicle to stop.

To sum up the advantages of the present invention;

1. By introducing through an inlet port into chambers compressed air obtained by an air compression action of an engine, the engine can serve as an air motor rotating in the positive direction, thus affording not only to actuate the engine but to make the vehicle run in a short distance.

2. By introducing through a newly provided residual air exhaust port into chambers compressed air obtained by an air compression action of an engine, the engine can easily serve as an air motor.

3. By providing a means for adjusting spring force, valves are operated by suitable spring forces each for all actions such as an engine action, a compression action and air motor action thus ensuring opening and closing the valves, and spring forces are reduced at the time of cam change-over thus facilitating the displacement of cams.

4. A quick start-up with large torque can be expected with greater driver's handling convenience, which is more convenient than the slow start-up available with the electric cell motor.

5. The engine can be stopped at stays on a jammed road or at signal stops that are very often encountered in city and restarted immediately for driving the vehicle. Thus, the pollution with exhaust will be reduced and the fuel consumption will be lowered to contribute to the energy saving.

6. The apparatus involves the residual-air exhaust port and its valve, so that it can serve as an air-charging-efficiency improving means at the same time.

7. The compressed air can be continuously injected into the engine to drive the vehicle at a little distance, which will be useful for shifting the vehicle to the roadside on gasoline shortage, escaping from the area filled with inflammable gas or passing across the river, when the engine doesn't work.

8. To avoid the engine stop in summer which is often encountered with the vehicle of gasoline engine to which anti-air-pollution measures are applied, the apparatus is provided in combination with a cell motor to give a duplicate start-up system.

9. The compressed air to be supplied to start up and run the engine can be obtained by the compressor action of the engine, so that the complete release of compressed air hardly occurs, assuring the reliable operation of the apparatus.

10. Charging with a compressed air source can be accomplished within a very short time in comparison with charging the excessively discharged battery.

11. As the suction device is tightly suckedly attached to the travelling surface, strong braking is achieved by friction between the suction device and the travelling surface.

12. Due to sucked attachment of the suction device onto the travelling surface, the rear portion of the vehicle is lowered down thus strengthening the braking force by friction of tyres, and further preventing nose-dive and lateral slipping resulting from the displacement of the center of gravity when a dive brake of the vehicle is put on.

13. By using the apparatus in combination with a compression brake, surprising braking force can be obtained and at the same time it is very economical that compressed air obtained by the compression brake can be used in this apparatus.

What I claim is:

1. A convertible engine-air compressor apparatus adapted to be mounted on a vehicle for driving said vehicle comprising a body having a plurality of compression chambers in which explosion can take place, each of said compression chamnbers being provided with an inlet opening and an exhaust opening, an inlet valve and an exhaust valve mounted in the body for each compression chamber for opening and closing the inlet and exhaust openings, a piston reciprocably mounted within each compression chamber, crank shaft means rotatably mounted in the body and connected to the pistons for reciprocating the pistons, a cam shaft rotatably mounted on the body, means connecting the cam shaft and the crank shaft means for rotating the cam shaft, an inlet cam for the inlet valve of each compression chamber and an exhaust cam for the exhaust valve of each compression chamber mounted on the cam shaft, each inlet cam having an engine action segment and a compressor action segment spaced apart from each other and a cylindrical segment positioned therebetween, each exhaust cam having an engine action segment, a compressor action segment and an air motor segment positioned therebetween, tappet means for each cam reciprocably mounted on the body for opening and closing each inlet and exhaust valve, each of said engine action segments of each cam being shaped to reciprocate the associted tappet means one during each revolution of the cam shaft, each of said compressor action segments of each cam being shaped to reciprocate the associated tappet means twice during each revolution of the cam shaft, the cylindrical segment of each inlet cam being shaped so that it does not reciprocate the associated tappet means, the air motor segment of each exhaust cam being shaped to reciprocate the associated tapper means twice during each revolution of the cam shaft, the cam shaft being mounted on the body to permit axial adjustment thereof whereby the segments of the cams can be selectively moved into engagement with the associated tappet means.

2. The apparatus of claim 1 in which the engine action segment and compressor action segment of each inlet cam comprising inclined cam faces facing each other and the engine action segment and compressor action segment of each exhaust cam comprising inclined cam faces facing each other.

* * * * *